United States Patent
Petersson et al.

(10) Patent No.: US 10,693,552 B2
(45) Date of Patent: Jun. 23, 2020

(54) BEAM TRAINING OF A RADIO TRANSCEIVER DEVICE

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 15/739,383

(22) PCT Filed: Nov. 28, 2017

(86) PCT No.: PCT/EP2017/080604
§ 371 (c)(1),
(2) Date: Dec. 22, 2017

(87) PCT Pub. No.: WO2019/105521
PCT Pub. Date: Jun. 6, 2019

(65) Prior Publication Data
US 2020/0036431 A1  Jan. 30, 2020

(51) Int. Cl.
*H04B 7/08* (2006.01)
*H04L 5/00* (2006.01)
*H04W 72/04* (2009.01)

(52) U.S. Cl.
CPC ........... *H04B 7/0874* (2013.01); *H04B 7/088* (2013.01); *H04L 5/0048* (2013.01); *H04W 72/042* (2013.01)

(58) Field of Classification Search
CPC .................................................. H04B 7/0874
(Continued)

(56) References Cited

U.S. PATENT DOCUMENTS

2005/0101352 A1* 5/2005 Logothetis ............ H01Q 1/246
                                                                455/562.1
2015/0326317 A1* 11/2015 Michaelis ............ H04B 10/807
                                                                398/115
2016/0198474 A1   7/2016 Raghavan et al.

FOREIGN PATENT DOCUMENTS

WO    WO 2016/055092 A1    4/2016
WO    WO 2016/096001 A1    6/2016

OTHER PUBLICATIONS

Notification of Transmittal of the International Search Report and Written Opinion of the International Searching Authority for International Application No. PCT/EP2017/080604 dated Sep. 4, 2018, 13 pages.

* cited by examiner

*Primary Examiner* — Lihong Yu
(74) *Attorney, Agent, or Firm* — Sage Patent Group

(57) ABSTRACT

A method is performed for beam training of a radio transceiver device comprising device comprises at least two antenna arrays. During the beam training, a first set of occurrences of a reference signal is received using all the antenna arrays and such that one respective occurrence of the reference signal is received in one single wide beam at each of all the antenna arrays. The method comprises receiving, during the beam training, a second set of occurrences of the reference signal using less than all antenna arrays and such that one respective occurrence of the reference signal is received in each respective narrow at each of the less than all antenna arrays. Which of the less than all antenna arrays to receive the second set of occurrences of the reference signal is determined based on evaluation of reception of the first set of occurrences of the reference signal at each of all the antenna arrays.

19 Claims, 6 Drawing Sheets

(58) Field of Classification Search
 USPC .......................................................... 375/219
 See application file for complete search history.

BEAM TRAINING OF A RADIO TRANSCEIVER DEVICE

CROSS REFERENCE TO RELATED APPLICATION

This application is a 35 U.S.C. § 371 national stage application of PCT International Application No. PCT/EP2017/080604 filed on Nov. 28, 2017, the disclosure and content of which is incorporated herein by reference in its entirety.

TECHNICAL FIELD

Embodiments presented herein relate to a method, a radio transceiver device, a computer program, and a computer program product for beam training of the radio transceiver device. Embodiments presented herein further relate to a method, another radio transceiver device, a computer program, and a computer program product for beam training of the radio transceiver device.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the terminal devices might be required to reach a sufficient link budget.

In a communications network where a transmission and reception point (TRP) at the network side uses narrow beams for transmission, at least one of the narrow transmission beams is assumed to be discovered and monitored for each served terminal device at the user side. This process of discovering and monitoring is referred to as beam management.

In order to perform beam management the network node uses measurements (such as received reference signal power), as obtained and reported by the served terminal devices, on downlink reference signals such as channel state information reference signals (CSI-RS). The beam pair for which the highest received reference signal power was obtained is then used as the active beam pair link. In general terms, a beam pair is defined by a transmission beam at the transmitting end (such as at the TRP) and a corresponding reception beam at the receiving end (such as at the terminal device), where the transmission beam and the reception beam are selected from sets of available candidate beams so as to maximize a quality criterion (such as highest received reference signal power) for transmission from the transmitting end to the receiving end.

In order for a terminal device to find a suitable transmission beam the network node could transmit CSI-RS in different transmission beams on which the terminal device performs measurements and reports back the N≥1 best transmission beams (where the value of N can be configured by the network node).

Furthermore, the CSI-RS transmission in a given transmission beam can be repeated to allow the terminal device to evaluate suitable reception beam as used by the terminal device. This is sometime referred to as a "P3 procedure" or UE RX beam training.

Further, the CSI-RS can be transmitted periodically, semi-persistently or aperiodically (such as when being event triggered) and they can be either shared between multiple terminal devices (users) or be user-specific.

For terminal devices the incoming signals (such as the CSI-RS) might arrive from all different directions, depending on the location and orientation of the terminal device relative the transmitting TRP. Hence it might be beneficial to have an antenna implementation at the terminal device which has the possibility to generate omni-directional-like coverage in addition to the high gain narrow beams. One way to increase the omni-directional coverage at an terminal is to provide the terminal device with multiple antenna arrays, or panels, where the antenna arrays have mutually different pointing directions. In some aspects, a maximum two baseband chains at the terminal device might be used for mmW frequencies. A larger number of baseband chains might generate too much heat for the terminal device, especially for such large bandwidths that are expected at these high frequencies. In some aspects the terminal device might therefore include just one single baseband chain, where one and the same baseband chain can be alternatingly operatively connected, via a switch, to a respective antenna array.

During, for example, a UE RX beam training procedure, there could be many different UE RX beams for the terminal device to evaluate. This will increase overhead signalling. For example, assume that the terminal comprises two antenna arrays and that each antenna arrays is capable of generating 8 beams, then there will be in total 16 different UE RX beams to evaluate during a UE RX beam training procedure. If one orthogonal frequency-division multiplexing (OFDM) symbol is used for each beam, this means that in order to sweep through all beams, 16 OFDM symbols are needed, which requires several slots of overhead signaling.

The same issue is apparent in TRP RX beam a training procedure.

Hence, there is still a need for improved beam training procedure for terminal devices as well as network nodes.

SUMMARY

An object of embodiments herein is to provide efficient beam training that is applicable for radio transceiver devices such as terminal devices and network nodes.

According to a first aspect there is presented a method for beam training of a radio transceiver device. The method is performed by the radio transceiver device. The radio transceiver device comprises at least two antenna arrays. The method comprises receiving, during the beam training, a first set of occurrences of a reference signal using all the antenna arrays and such that one respective occurrence of the reference signal is received in one single wide beam at each of all the antenna arrays. The method comprises receiving, during the beam training, a second set of occurrences of the reference signal using less than all antenna arrays and such that one respective occurrence of the reference signal is received in each respective narrow at each of the less than all antenna arrays. Which of the less than all antenna arrays to receive the second set of occurrences of the reference signal is determined based on evaluation of reception of the first set of occurrences of the reference signal at each of all the antenna arrays.

According to a second aspect there is presented a radio transceiver device for beam training of the radio transceiver device. The radio transceiver device comprises at least two antenna arrays and processing circuitry. The processing circuitry is configured to cause the radio transceiver device to receive, during the beam training, a first set of occurrences of a reference signal using all the antenna arrays and such that one respective occurrence of the reference signal is received in one single wide beam at each of all the antenna arrays. The processing circuitry is configured to cause the radio transceiver device to receive, during the beam training, a second set of occurrences of the reference signal using less than all antenna arrays and such that one respective occurrence of the reference signal is received in each respective narrow beam at each of the less than all antenna arrays. Which of the less than all antenna arrays to receive the second set of occurrences of the reference signal is determined based on evaluation of reception of the first set of occurrences of the reference signal at each of all the antenna arrays.

According to a third aspect there is presented a radio transceiver device for beam training of the radio transceiver device. The radio transceiver device comprises at least two antenna arrays. The radio transceiver device comprises a receive module configured to receive, during the beam training, a first set of occurrences of a reference signal using all the antenna arrays and such that one respective occurrence of the reference signal is received in one single wide beam at each of all the antenna arrays. The radio transceiver device comprises a receive module configured to receive, during the beam training, a second set of occurrences of the reference signal using less than all antenna arrays and such that one respective occurrence of the reference signal is received in each respective narrow beam at each of the less than all antenna arrays. Which of the less than all antenna arrays to receive the second set of occurrences of the reference signal is determined based on evaluation of reception of the first set of occurrences of the reference signal at each of all the antenna arrays.

According to a fourth aspect there is presented a computer program for beam training of the radio transceiver device. The computer program comprises computer program code which, when run on processing circuitry of a radio transceiver device comprising at least two antenna arrays, causes the radio transceiver device to perform a method according to the first aspect.

According to a fifth aspect there is presented a method for beam training of another radio transceiver device. The method is performed by a radio transceiver device. The method comprises transmitting, during the beam training, a first set of occurrences of a reference signal according to antenna array configuration information of the another radio transceiver device. The method comprises transmitting, during the beam training, a second set of occurrences of the reference signal according to the antenna array configuration information.

According to a sixth aspect there is presented a radio transceiver device for beam training of another radio transceiver device. The radio transceiver device comprises processing circuitry. The processing circuitry is configured to cause the radio transceiver device to transmit, during the beam training, a first set of occurrences of a reference signal according to antenna array configuration information of the another radio transceiver device. The processing circuitry is configured to cause the radio transceiver device to transmit, during the beam training, a second set of occurrences of the reference signal according to the antenna array configuration information.

According to a seventh aspect there is presented a radio transceiver device for beam training of another radio transceiver device. The radio transceiver device comprises a transmit module configured to transmit, during the beam training, a first set of occurrences of a reference signal according to antenna array configuration information of the another radio transceiver device. The radio transceiver device comprises a transmit module configured to transmit, during the beam training, a second set of occurrences of the reference signal according to the antenna array configuration information.

According to an eight aspect there is presented a computer program for beam training of another radio transceiver device, the computer program comprising computer program code which, when run on processing circuitry of a radio transceiver device, causes the radio transceiver device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these radio transceiver devices, and these computer programs provide efficient beam training of the radio transceiver device.

Advantageously the proposed beam training has less overhead compared to conventional beam training, without the performance being deteriorated.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
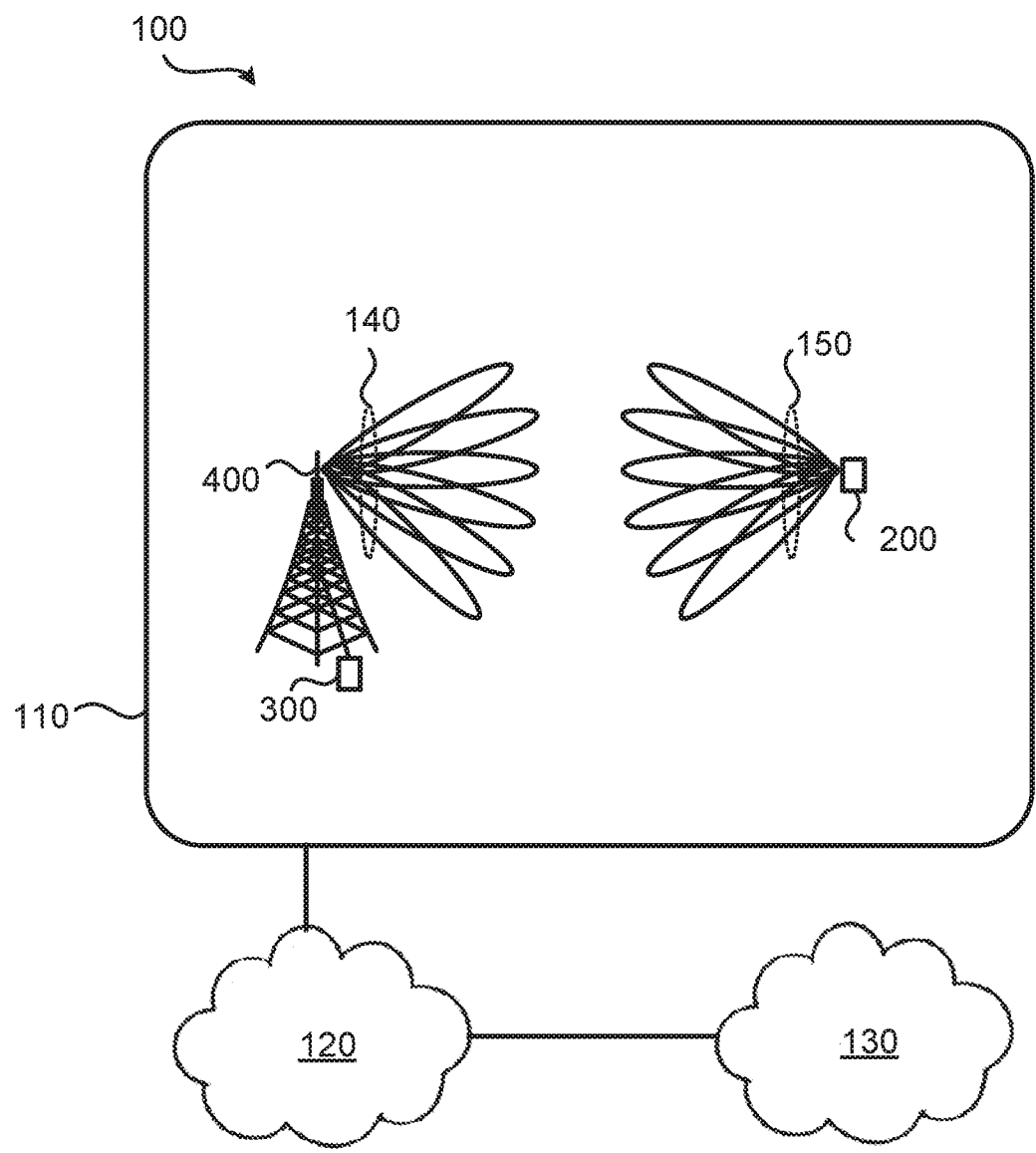
FIG. 1 is a schematic diagram illustrating a communications network according to embodiments.

FIG. 1 is a schematic diagram illustrating a communications network 100 where embodiments presented herein can be applied. The communications network 100 is typically a fifth (5G) telecommunications network and thus supports any thereto applicable 3GPP telecommunications standard.

The communications network 100 comprises a radio transceiver device 300 that is configured to provide network access to radio transceiver device 200 in a cell of a radio access network 110. The radio access network 110 is operatively connected to a core network 120. The core network 120 is in turn operatively connected to a service network 130, such as the Internet. Radio transceiver device 200 is thereby, via radio transceiver device 300, enabled to access services of, and exchange data with, the service network 130.

Examples of network nodes 200 are radio access network nodes, radio base stations, base transceiver stations, Node Bs, evolved Node Bs, g Node Bs, access points, and access nodes. Examples of radio transceiver device 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

In the illustrative example of FIG. 1, radio transceiver device 300 provides network access in the cell by transmitting signals to, and receiving signals from, radio transceiver device 200 in beams belonging to a set of beams 140. The signals could be transmitted from, and received by, a TRP 400 of radio transceiver device 300. The TRP 400 could form an integral part of radio transceiver device 300 or be physically separated from radio transceiver device 300. Further, radio transceiver device 200 is configured to transmit signals to, and receive signals from, radio transceiver device 300 in beams belonging to a set of beams 150.

Figure 2:
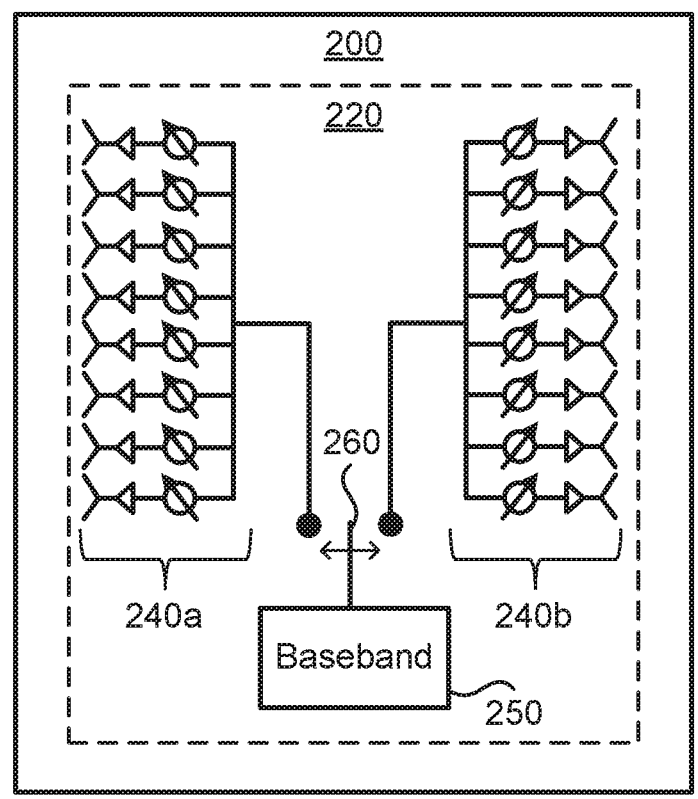
FIG. 2 is a schematic illustration of a radio transceiver device according to an embodiment.

FIG. 2 is a schematic illustration of part of radio transceiver device 200 according to an embodiment. Particularly, according to the illustrative example of FIG. 2, radio transceiver device 200 has two antenna arrays 240a, 240b that are connectable to one single baseband unit 250 via a switch 260. The antenna arrays 240a, 240b, and the baseband unit 250 might be part of a communications interface 220 of radio transceiver device 200. Although the illustrative example of FIG. 2 shows a radio transceiver device 200 having two antenna arrays 240a, 240b and one single baseband unit 250, the herein disclosed embodiments are applicable to radio transceiver devices 200 having any number of baseband chains and antenna arrays.

The embodiments disclosed herein relate to mechanisms for beam training of radio transceiver device 200. In order to obtain such mechanisms there is provided a radio transceiver device 200, a method performed by radio transceiver device 200, a computer program product comprising code, for example in the form of a computer program, that when run on processing circuitry of radio transceiver device 200, causes radio transceiver device 200 to perform the method. In order to obtain such mechanisms there is further provided a radio transceiver device 300, a method performed by radio transceiver device 300, and a computer program product comprising code, for example in the form of a computer program, that when run on processing circuitry of radio transceiver device 300, causes radio transceiver device 300 to perform the method.

Figures 3, 4:
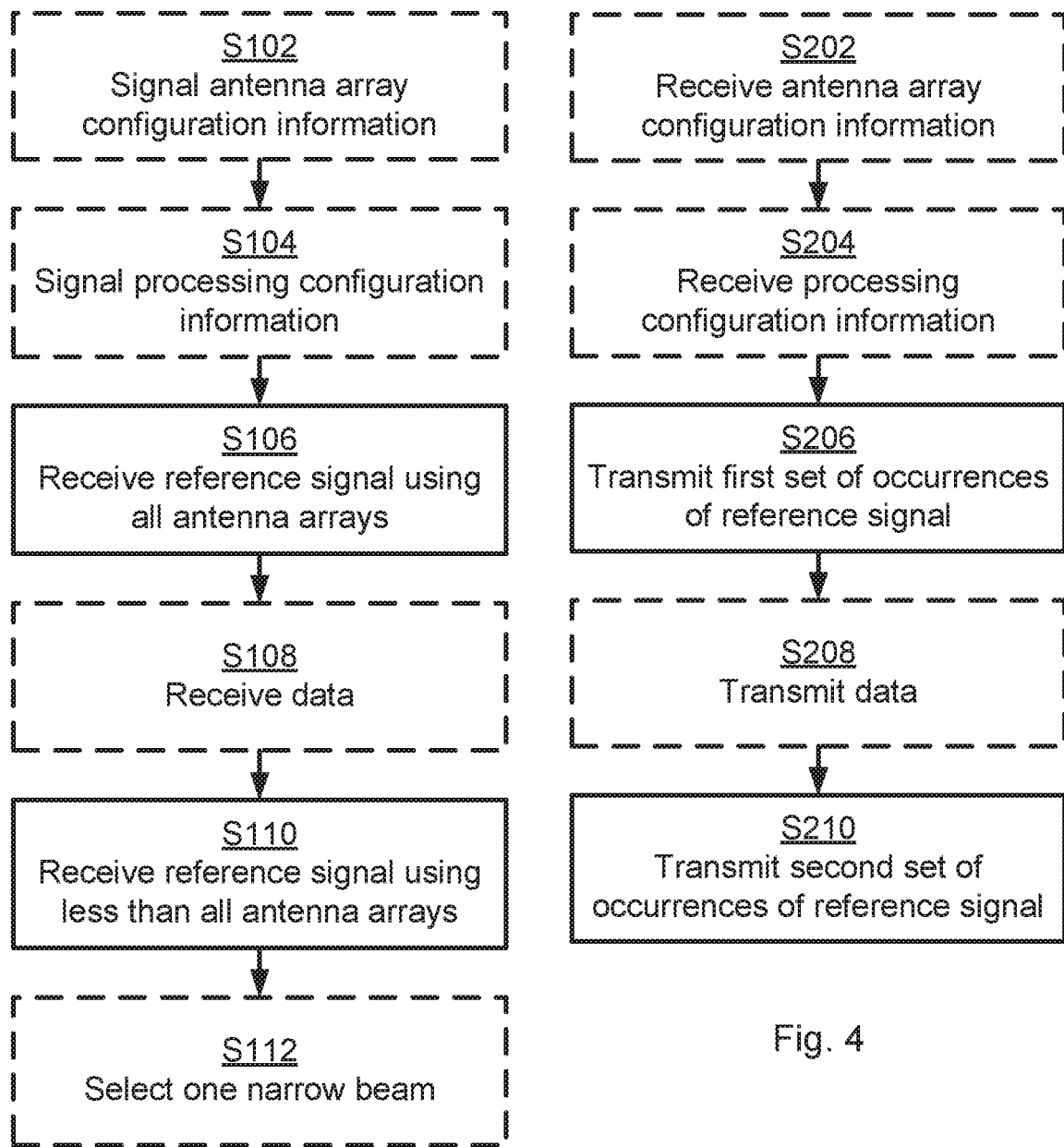
FIGS. 3 and 4 are flowcharts of methods according to embodiments.

Reference is now made to FIG. 3 illustrating embodiments of methods for beam training of radio transceiver device 200 as performed by radio transceiver device 200 itself. As noted above, radio transceiver device 200 comprises at least two antenna arrays 240a, 240b.

During the beam training radio transceiver device 200, starts with using one wide beam per antenna array and then evaluates, according to some metric, which antenna array is best. Hence, transceiver device 200 is configured to perform step S106:

S106: Radio transceiver device 200 receives, during the beam training, a first set of occurrences of a reference signal using all the antenna arrays 240a, 240b and such that one respective occurrence of the reference signal is received in one single wide beam A0, B0 at each of all the antenna arrays 240a, 240b.

Radio transceiver device 200 then switches to the best antenna array and evaluates narrow beams for that antenna array. Hence, transceiver device 200 is configured to perform step S110:

S110: Radio transceiver device 200 receives, during the beam training, a second set of occurrences of the reference signal using less than all antenna arrays 240a, 240b and such that one respective occurrence of the reference signal is received in each respective narrow beam B1, B2, . . . , B8 at each of the less than all antenna arrays 240a, 240b.

Which of the less than all antenna arrays 240a, 240b to receive the second set of occurrences of the reference signal is determined based on evaluation of reception of the first set of occurrences of the reference signal at each of all the antenna arrays 240a, 240b.

Hence, during the beam training, radio transceiver device 200 first evaluates which antenna arrays that is best, and then evaluates, for the best antenna array, which beam is best for transceiver device 200.

Embodiments relating to further details of beam training of radio transceiver device 200 as performed by radio transceiver device 200 will now be disclosed.

There could be different ways for radio transceiver device 200 to receive the second set of occurrences of the reference signal.

In some aspects, only one single antenna array is used for receiving the second set of occurrences of the reference signal. Particularly, according to an embodiment, only a single one of the antenna arrays 240a, 240b is used when receiving the second set of occurrences of the reference signal.

In some aspects, only one single antenna array is eliminated after the first set of occurrences of the reference signal has been received. Particularly, according to an embodiment, the less than all antenna arrays 240a, 240b includes all but one of all the antenna arrays 240a, 240b.

In some aspects, at least one antenna array is eliminated after the first set of occurrences of the reference signal has been received and at least two antenna arrays are used for receiving the second set of occurrences of the reference signal. Particularly, according to an embodiment, radio transceiver device 200 comprises at least three antenna arrays 240a, 240b, and the less than all antenna arrays 240a, 240b includes at least two antenna arrays 240a, 240b.

In some aspects the reception of the second set of occurrences of the reference signal enables radio transceiver device 200 to select one beam for further reception of signals. Particularly, according to an embodiment, radio transceiver device 200 is configured to perform (optional) step S112:

S112: Radio transceiver device 200 selects one of the narrow beams B1, B2, . . . , B8 to use for further reception of signals based on evaluation of reception of the second set of occurrences of the reference signal at the less than all antenna arrays 240a, 240b.

In some aspects channel reciprocity is assumed and the same selected narrow beam might thus be used for both reception and transmission of signals. Particularly, according to an embodiment, the selected one of the narrow beams B1, B2, . . . , B8 also is selected for transmission of signals.

In some aspects radio transceiver device 200 signals its antenna array configuration to the sender of the reference signal in order for the sender to correctly schedule at least the transmission of the first set of occurrences of the reference signal and the second set of occurrences of the reference signal, Particularly, according to an embodiment, the reference signal is transmitted from radio transceiver device 300 and radio transceiver device 200 is configured to perform (optional) step S102:

S102: Radio transceiver device 200 signals antenna array configuration information to radio transceiver device 300. The antenna array configuration information specifies how many antenna arrays 240a, 240b radio transceiver device 200 comprises and how many narrow beams B1, B2, . . . , B8 per antenna array 240a, 240b radio transceiver device 200 is to evaluate during the beam training.

There might be different metrics used by radio transceiver device 200 to evaluate the reception of the first set of occurrences of the reference signal. Particularly, according to an embodiment, the evaluation of reception of the first set of occurrences of the reference signal is based on measurements of at least one of reference signal received power (RSRP) and signal to interference plus noise ratio (SINR) of the first set of occurrences of the reference signal in the single wide beam at each respective one of all the antenna arrays 240a, 240b.

In some aspects there is a time gap between the first set of occurrences of the reference signal and the second set of occurrences of the reference signal. Particularly, according to an embodiment, the second set of occurrences of the reference signal is received after a time interval after receiving the first set of occurrences of the reference signal.

In order to minimize the overhead signaling, during the time it takes for radio transceiver device 200 to evaluate which antenna array 240a, 240b that was best, radio transceiver device 300 could schedule radio transceiver device 200 with other useful transmissions, for example data on a physical downlink control channel (PDCCH) or physical downlink shared channel PDSCH. That is, in some aspects the time gap is used for transmission of data to radio transceiver device 200. Particularly, according to an embodiment, radio transceiver device 200 is configured to perform (optional) step S108:

S108: Radio transceiver device 200 receives control and/or data during the time interval.

Radio transceiver device 200 might receive the data in step S108 using a most-recently used narrow beam for receiving data.

In some aspects the length of the time gap is adapted to processing speed of radio transceiver device 200. Particularly, according to an embodiment, the time interval has a length based on processing speed of the radio transceiver device 200 to evaluate the reception of the first set of occurrences of the reference signal.

In some aspects radio transceiver device 200 signals its processing configuration to the sender of the reference signal in order for the sender to correctly adapting the length used for the transmission of data during the time interval. Particularly, according to an embodiment, the reference signal is transmitted from radio transceiver device 300, and radio transceiver device 200 is configured to perform (optional) step S104:

S104: Radio transceiver device 200 signals processing configuration information to radio transceiver device 300. The processing configuration information specifies the processing speed.

In some aspects the length of the time gap is adapted to the periodicity that certain signals, such as a synchronization signal (SS) physical broadcast channel (PBCH) block, or just synchronization signal block (SSB) for short, are transmitted with. For example, each SSB might consist of four OFDM symbols; one representing a primary synchronization signal (PSS), two representing PBCH signals, and one representing a secondary synchronization signal (SSS). The SSB is might be transmitted with a periodicity of about 5 to 100 ms.

It is thereby possible for radio transceiver device 200 to perform measurements on at most four antenna arrays (such as for beams A0 and B0) for one SSB and during the next SSB perform measurements on at most four beams (such as for beams B1-B4) for one antenna array and then during the next SSB again perform measurements on at most four beams (such as for beams B5-B8) for the same antenna array, and so on.

There could be different kinds of restrictions on radio transceiver device 200 with regards to its transmission and reception capabilities. In some aspects radio transceiver device 200 is restricted to only receive in one beam at the time. Particularly, according to an embodiment, radio transceiver device 200 only is capable of using one single antenna array 240a, 240b at a time for reception of the reference signal.

There could be different kinds of configurations of radio transceiver device 200 with regards to the antenna arrays 240a, 240b. For example, as in the illustrative example of FIG. 2, all antenna arrays might be operatively connected to the same baseband unit 250. Particularly, according to an embodiment, all the antenna arrays 240a, 240b are operatively connectable to one common baseband unit 250 in radio transceiver device 200. The switch 260 might then be used to selectively connect the different antenna arrays 240a, 240b to the baseband unit 250 at different times.

There could be different ways for radio transceiver device 200 to generate the wide beams A0, B0 and the narrow beams B1-B8. Particularly, according to an embodiment, radio transceiver device 200 is arranged for analog beamforming.

In further detail, by applying principles disclosed in document WO2011/050866A1 it is, for example, possible to generate as wide array beam widths (for the beams A0, B0) as the element beam width of the antenna arrays 240a, 240b, regardless of how many antenna elements there are in the antenna array 240a, 240b, thus resulting in dual-polarization beamforming. Dual-polarization beamforming can thus be used to selectively widening or narrowing the beams as needed. Hence, principles disclosed in document WO2011/050866A1 can be applied to the analog beamforming network in order to generate the wide beams A0, B0 as well as the narrow beams B1-B8. Other examples of principles that could be used to generate wide beams A0, B0 as needed are based on optimizing complex weights of the antenna array 240a, 240b of the analog beamforming network or by muting some antenna elements of the antenna array 240a, 240b. A way to generate wide receive beams 140a, 140b with phase shifts only is by means of the array expansion technique described in WO2016141961 A1. WO2016141961 A1 relates to beam forming using an antenna array comprising dual polarized elements. By adapting and then applying the expansion technique described in WO2016141961 A1 it is possible to generate as wide beams or as narrow beams as possible using phase shifts only at the antenna arrays 240a, 240b.

Reference is now made to FIG. 4 illustrating embodiments of methods for beam training of radio transceiver device 200 as performed by radio transceiver device 300.

As disclosed above, radio transceiver device 200 is assumed to receive a first set of occurrences of a reference signal from a sender, such as from radio transceiver device 300. Radio transceiver device 300 is therefore configured to perform step S206:

S206: Radio transceiver device 300 transmits, during the beam training, a first set of occurrences of a reference signal according to antenna array configuration information of radio transceiver device 200.

As disclosed above, radio transceiver device 200 is assumed to receive a second set of occurrences of a reference signal from a sender, such as from radio transceiver device 200. Radio transceiver device 300 is therefore configured to perform step S210:

S210: Radio transceiver device 300 transmits, during the beam training, a second set of occurrences of the reference signal according to the antenna array configuration information.

Embodiments relating to further details of beam training of another radio transceiver device 200 as performed by radio transceiver device 300 will now be disclosed.

As disclosed above, in some aspects radio transceiver device 200 has an antenna array configuration. Particularly, according to an embodiment, the antenna array configuration information specifies how many antenna arrays 240a, 240b radio transceiver device 200 comprises and how many narrow beams B1, B2, . . . , B8 per antenna array 240a, 240b radio transceiver device 200 is to evaluate during the beam training.

Radio transceiver device 3000 might then adapt the first set of occurrences of the reference signal and the second set of occurrences of the reference signal according to the antenna array configuration information. Particularly, according to an embodiment, the first set of occurrences includes as many occurrences as needed for one occurrence of the reference signal to be received using each of the antenna arrays 240a, 240b and the second set of occurrences includes as many occurrences as there are narrow beams.

As disclosed above, in some aspects radio transceiver device 200 signals its antenna array configuration to radio transceiver device 300. Particularly, according to an embodiment, radio transceiver device 300 is configured to perform (optional) step S202:

S202: Radio transceiver device 300 receives the antenna array configuration information from radio transceiver device 200 prior to transmitting the first set of occurrences of the reference signals.

As disclosed above, in some aspects there is a time gap between the first set of occurrences of the reference signal and the second set of occurrences of the reference signal. Particularly, according to an embodiment, the second set of occurrences of the reference signal is transmitted after a time interval after transmitting the first set of occurrences of the reference signal.

As disclosed above, in some aspects the time gap is used for transmission of data to radio transceiver device 200. Particularly, according to an embodiment, radio transceiver device 200 is configured to perform (optional) step S208:

S208: Radio transceiver device 300 transmits control and/or data to radio transceiver device 200 during the time interval.

This means that, when each occurrences of the reference signal is transmitted using one OFDM symbol, radio transceiver device 300 will first transmit the reference signal with one occurrence of the first set of occurrences of the reference signal in one respective OFDM symbol, then schedule other data on one or more OFDM symbols, and then transmit the reference signal with one occurrence of the second set of occurrences of the reference signal in one respective OFDM symbol.

As disclosed above, in some aspects the length of the time gap is adapted to processing speed of radio transceiver device 200. Particularly, according to an embodiment, the time interval has a length based on processing speed of radio transceiver device 200 to evaluate reception of the first set of occurrences of the reference signal.

As disclosed above, in some aspects radio transceiver device 200 signals its processing configuration to radio transceiver device 300. Particularly, according to an embodiment, radio transceiver device 300 is configured to perform (optional) step S204:

S204: Radio transceiver device 300 receives processing configuration information from radio transceiver device 200. The processing configuration information specifies the processing speed.

Radio transceiver device 300 might then, for example select how many OFDM symbols with data to transmit during the time interval between the first set of occurrences of the reference signal and the second set of occurrences of the reference signal.

As disclosed above, in some aspects the length of the time gap is adapted to the periodicity that certain signals, such as SSB, are transmitted with.

There might be different ways to facilitate transmission of the reference signals in each of the occurrences. Particularly, according to an embodiment, the reference signal in each of the occurrences occupies one OFDM symbol.

There might be different examples of reference signals. Particularly, according to an embodiment, the reference signal is either a CSI-RS, an SSB, or a sounding reference signal (SRS). The reference signals are typically CSI-RS or SSB when radio transceiver device 200 is a terminal device and radio transceiver device 300 is a network node. The reference signals are typically SRS when radio transceiver device 200 is a network node and radio transceiver device 300 is a terminal device.

One particular embodiment for beam training of radio transceiver device 200 based on at least some of the above disclosed embodiments will now be disclosed in detail.

Figure 5:
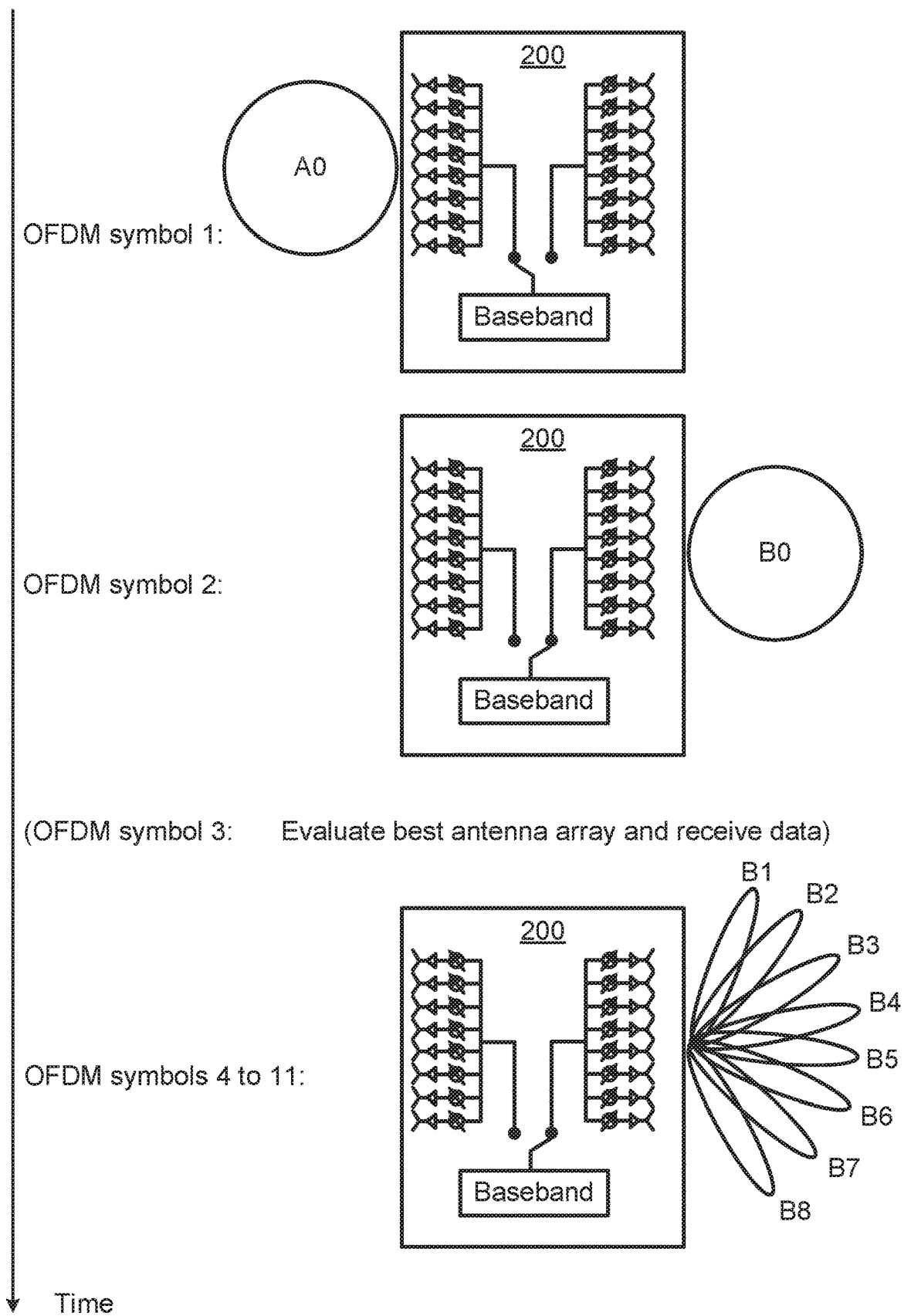
FIG. 5 is a schematic illustration of beam training performed by a radio transceiver device according to an embodiment.

FIG. 5 illustrates one embodiment of radio transceiver device 200 as applied during a UE RX beam training procedure. In this illustrative embodiment radio transceiver device 200 is thus typically a terminal device and radio transceiver device 300 is typically a network node.

It is assumed that radio transceiver device 300 sequentially transmits 11 OFDM symbols. Further, in this illustrative example, radio transceiver device 300 has scheduled transmission of CSI-RS in the first two OFDM symbols, data in the third OFDM symbol, and CSI-RS in OFDM symbols 4-11.

OFDM symbol 1: During transmission of the first OFDM symbol, radio transceiver device 200 has the baseband chain 250 connected to the left antenna array 240a through the switch 260 and creates a wide beam B0 for that antenna array.

OFDM symbol 2: During transmission of the second OFDM symbol, radio transceiver device 200 has the baseband chain 250 connected to the right antenna array 240b and applies a wide beam B0 for that antenna array.

The wide beams A0, B0 could for example be generated by using phase tapering and/or amplitude tapering. Further examples to generate beams being as wide as needed (and as narrow as needed) have been disclosed above.

OFDM symbol 3: During transmission of the third OFDM symbol, radio transceiver device 200 evaluates which antenna array has the strongest RSRP, which will take some time (one or multiple OFDM symbols depending on processing capacity at radio transceiver device 200). During this time, radio transceiver device 200 might be scheduled with other transmissions (e.g. control data transmitted on PDCCH or PDSCH) that can be received by radio transceiver device 200 whilst performing RSRP calculations. Radio transceiver device 200 might during the third OFDM symbol temporarily switch to the previously known best UE RX beam to properly receive the so-called other transmissions.

OFDM symbols 4-11: When radio transceiver device 200 has evaluated which antenna array that has the highest RSRP, radio transceiver device 200 connects the baseband to that antenna array and starts sweeping through the narrow beams for that antenna array. In the present illustrative example it is assumed that the right antenna array has highest RSRP and thus that narrow beams B1-B8 are swept through.

In the example of FIG. 5, a total of 10 OFDM symbols are scheduled with CSI-RS for finding a suitable UE RX beam, which is 6 OFDM symbols less compared to if 8 narrow beams are swept through sequentially for each antenna array (i.e., 16 narrow beams in total).

Figure 6:
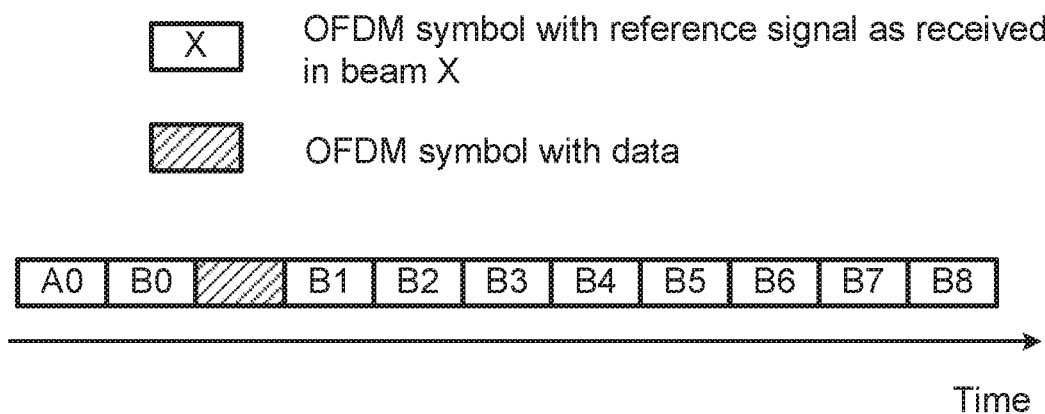
FIG. 6 is a schematic illustration of a scheduled sequence of OFDM symbols during beam training according to an embodiment.

FIG. 6 illustrates the scheduling of OFDM symbols for the example of FIG. 5. Slots are not explicitly marked in FIG. 6. All 11 OFDM symbols contain CSI-RS except the third OFDM symbol which contains control or data, such as transmitted on PDCCH or PDSCH. During this third OFDM symbol radio transceiver device 200 determines which panel that has highest RSRP.

Figure 7:
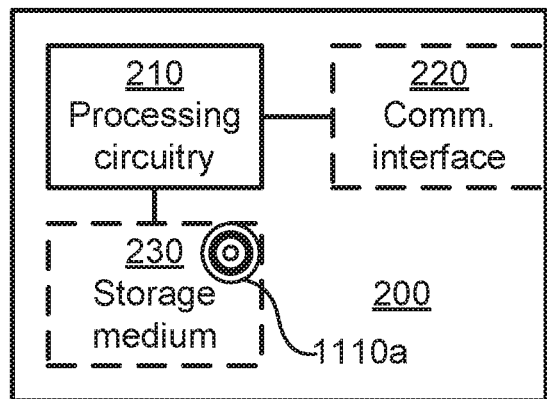
FIG. 7 is a schematic diagram showing functional units of a radio transceiver device according to an embodiment.

FIG. 7 schematically illustrates, in terms of a number of functional units, the components of radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause radio transceiver device 200 to perform a set of operations, or steps, S102-S112, as disclosed above. For example, the storage medium 230 may store the set of operations, and the processing circuitry 210 may be configured to retrieve the set of operations from the storage medium 230 to cause radio transceiver device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

Radio transceiver device 200 may further comprise a communications interface 220 for communications with other entities, nodes, functions, and devices of the communications network 100, such as radio transceiver device 300. As such the communications interface 220 may comprise one or more transmitters and receivers, comprising analogue and digital components.

Signals could be transmitted from, and received by, at least two antenna arrays 240a, 240b of radio transceiver device 200. The at least two antenna arrays 240a, 240b could form an integral part of radio transceiver device 200 or be physically separated from radio transceiver device 300. The communications interface 220 might thus optionally comprise the at least two antenna arrays 240a, 240b, as in FIG. 2.

The processing circuitry 210 controls the general operation of radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of radio transceiver device 200 are omitted in order not to obscure the concepts presented herein.

Figure 8:
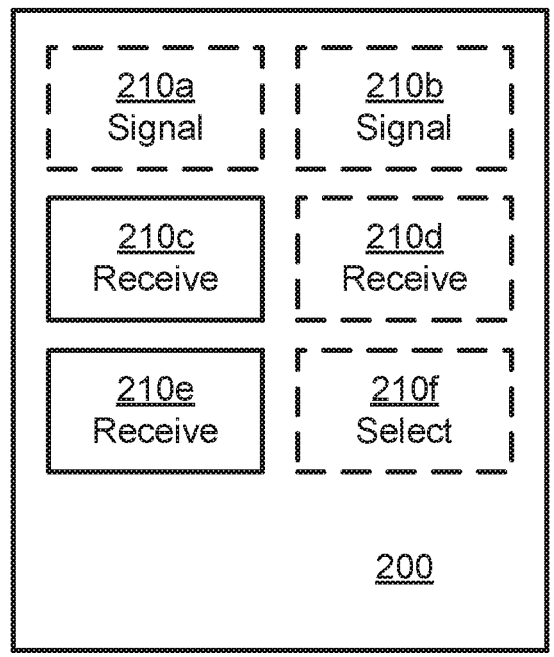
FIG. 8 is a schematic diagram showing functional modules of a radio transceiver device according to an embodiment.

FIG. 8 schematically illustrates, in terms of a number of functional modules, the components of radio transceiver device 200 according to an embodiment. Radio transceiver device 200 of FIG. 8 comprises a number of functional modules; a receive module 210C configured to perform step S106 and a receive module 210e configured to perform step S110. Radio transceiver device 200 of FIG. 8 may further comprise a number of optional functional modules, such as any of a signal module 210a configured to perform step S102, a signal module 210b configured to perform step S104, a receive module 210d configured to perform step S108, and a select module 210f configured to perform step S112. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of radio transceiver device 200 as disclosed herein.

Figure 9:
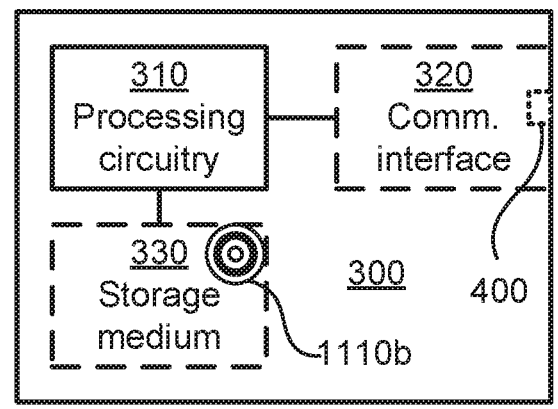
FIG. 9 is a schematic diagram showing functional units of a radio transceiver device according to an embodiment.

FIG. 9 schematically illustrates, in terms of a number of functional units, the components of radio transceiver device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause radio transceiver device 300 to perform a set of operations, or steps, S202-S210, as disclosed above. For example, the storage medium 330 may store the set of operations, and the processing circuitry 310 may be configured to retrieve the set of operations from the storage medium 330 to cause radio transceiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

Radio transceiver device 300 may further comprise a communications interface 320 for communications with other entities, nodes, functions, and devices of the communications network 100, such as radio transceiver device 200. As such the communications interface 320 may comprise one or more transmitters and receivers, comprising analogue and digital components.

Signals could be transmitted from, and received by, a TRP 400 of radio transceiver device 300. The TRP 400 could form an integral part of radio transceiver device 300 or be physically separated from radio transceiver device 300. The communications interface 220 might thus optionally comprise the TRP 400.

The processing circuitry 310 controls the general operation of radio transceiver device 300 e.g. by sending data and control signals to the communications interface 320 and the storage medium 330, by receiving data and reports from the communications interface 320, and by retrieving data and instructions from the storage medium 330. Other components, as well as the related functionality, of radio transceiver device 300 are omitted in order not to obscure the concepts presented herein.

Figure 10:
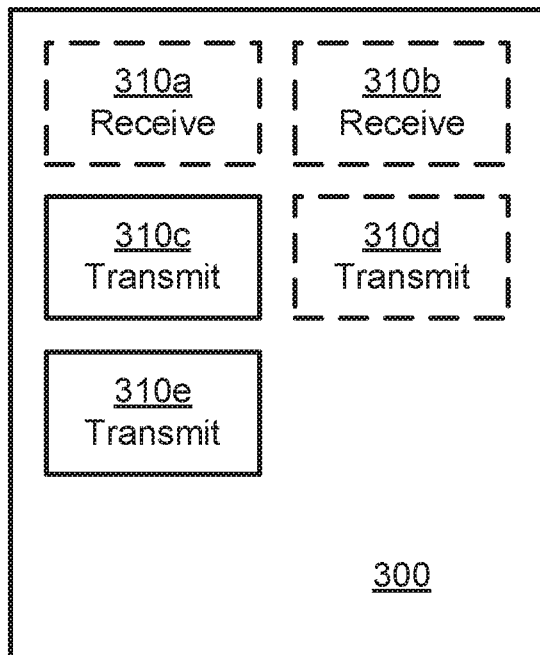
FIG. 10 is a schematic diagram showing functional modules of a radio transceiver device according to an embodiment.

FIG. 10 schematically illustrates, in terms of a number of functional modules, the components of radio transceiver device 300 according to an embodiment. Radio transceiver device 300 of FIG. 10 comprises a number of functional modules; a transmit module 310c configured to perform step S206 and a transmit module 310e configured to perform step S210. Radio transceiver device 300 of FIG. 10 may further comprise a number of optional functional modules, such as any of a receive module 310a configured to perform step S202, a receive module 310b configured to perform step S204, and a transmit module 310d configured to perform step S208. In general terms, each functional module 310a-310e may be implemented in hardware or in software. Preferably, one or more or all functional modules 310a-310e may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310e and to execute these instructions, thereby performing any steps of radio transceiver device 300 as disclosed herein.

Radio transceiver radio transceiver device 300 may be provided as a standalone device or as a part of at least one further device. For example, radio transceiver device 300 may be provided in a node of the radio access network or in a node of the core network. Alternatively, functionality of radio transceiver device 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by radio transceiver device 300 may be executed in a first device, and a second portion of the of the instructions performed by radio transceiver device 300 may be executed in a second device; the herein disclosed embodiments are not limited to any particular number of devices on which the instructions performed by radio transceiver device 300 may be executed. Hence, the methods according to the herein disclosed embodiments are suitable to be performed by radio transceiver device 300 residing in a cloud computational environment. Therefore, although a single processing circuitry 310 is illustrated in FIG. 9 the processing circuitry 310 may be distributed among a plurality of devices, or nodes. The same applies to the functional modules 310a-310e of FIG. 10 and the computer program 1120b of FIG. 11 (see below).

Figure 11:
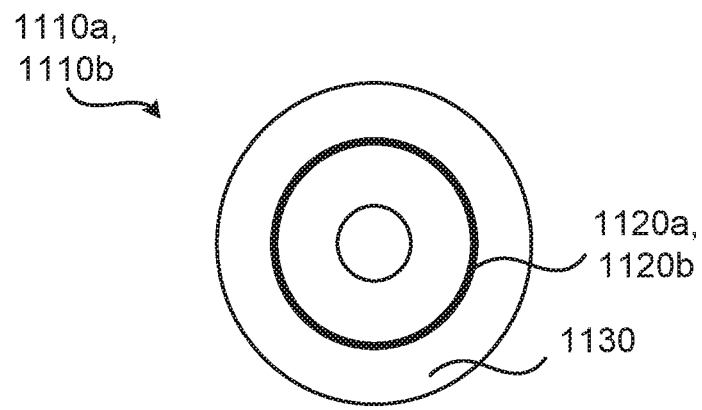
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 110a may thus provide means for performing any steps of radio transceiver device 200 as herein disclosed. On this computer readable means 1130, a computer program 1120b can be stored, which computer program mob can cause the processing circuitry 310 and thereto operatively coupled entities and devices, such as the communications interface 320 and the storage medium 330, to execute methods according to embodiments described herein. The computer program 1120b and/or computer program product mob may thus provide means for performing any steps of radio transceiver device 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120*a*, 1120*b* is here schematically shown as a track on the depicted optical disk, the computer program 1120*a*, 1120*b* can be stored in any way which is suitable for the computer program product 1110*a*, 1110*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam training of a radio transceiver device, the method being performed by the radio transceiver device, the radio transceiver device comprising at least two antenna arrays, the method comprising:
   receiving, during the beam training, a first set of occurrences of a reference signal using all the antenna arrays and such that one respective occurrence of the reference signal is received in one single wide beam at each of all the antenna arrays; and
   receiving, during the beam training, a second set of occurrences of the reference signal using less than all antenna arrays and such that one respective occurrence of the reference signal is received in each respective narrow beam at each of the less than all antenna arrays,
   wherein which of the less than all antenna arrays to receive the second set of occurrences of the reference signal is determined based on evaluation of reception of the first set of occurrences of the reference signal at each of all the antenna arrays,
   wherein only a single one of the antenna arrays is used when receiving the second set of occurrences of the reference signal.

2. The method according to claim 1, wherein the less than all antenna arrays includes all but one of all the antenna arrays.

3. The method according to claim 1, wherein the radio transceiver device comprises at least three antenna arrays, and wherein the less than all antenna arrays includes at least two antenna arrays.

4. The method according to claim 1, further comprising:
   selecting one of the narrow beams to use for further reception of signals based on evaluation of reception of the second set of occurrences of the reference signal at the less than all antenna arrays.

5. The method according to claim 4, wherein the selected one of the narrow beams also is selected for transmission of signals.

6. The method according to claim 1, wherein the reference signal is transmitted from another radio transceiver device, the method further comprising:
   signaling antenna array configuration information to the another radio transceiver device, the antenna array configuration information specifying how many antenna arrays the radio transceiver device comprises and how many narrow beams per antenna array the radio transceiver device is to evaluate during the beam training.

7. The method according to claim 1, wherein the evaluation of reception of the first set of occurrences of the reference signal is based on measurements of at least one of reference signal received power and signal to interference plus noise ratio of the first set of occurrences of the reference signal in the single wide beam at each respective one of all the antenna arrays.

8. The method according to claim 1, wherein the second set of occurrences of the reference signal is received after a time interval after receiving the first set of occurrences of the reference signal.

9. The method according to claim 8, further comprising:
   receiving control or data during the time interval.

10. The method according to claim 8, wherein the time interval has a length based on processing speed of the radio transceiver device to evaluate the reception of the first set of occurrences of the reference signal.

11. The method according to claim 10, wherein the reference signal is transmitted from another radio transceiver device, the method further comprising:
   signaling processing configuration information to the another radio transceiver device, the processing configuration information specifying the processing speed.

12. The method according to claim 1, wherein the radio transceiver device only is capable of using one single antenna array at a time for reception of the reference signal.

13. The method according to claim 1, wherein all the antenna arrays are operatively connectable to one common baseband unit in the radio transceiver device.

14. The method according to claim 1, wherein the radio transceiver device is arranged for analog beamforming.

15. The method according to claim 1, wherein the reference signal in each of the occurrences occupies one orthogonal frequency-division multiplexing, OFDM, symbol.

16. The method according to claim 1, wherein the reference signal is either a channel state information reference signal, CSI-RS, a synchronization signal block, SSB, or a sounding reference signal, SRS.

17. A radio transceiver device for beam training of the radio transceiver device, the radio transceiver device comprising at least two antenna arrays and processing circuitry, the processing circuitry being configured to cause the radio transceiver device to:
   receive, during the beam training, a first set of occurrences of a reference signal using all the antenna arrays and such that one respective occurrence of the reference signal is received in one single wide beam at each of all the antenna arrays; and
   receive, during the beam training, a second set of occurrences of the reference signal using less than all antenna arrays and such that one respective occurrence of the reference signal is received in each respective narrow beam at each of the less than all antenna arrays,
   wherein which of the less than all antenna arrays to receive the second set of occurrences of the reference signal is determined based on evaluation of reception of the first set of occurrences of the reference signal at each of all the antenna arrays,
   wherein only a single one of the antenna arrays is used when receiving the second set of occurrences of the reference signal.

18. A radio transceiver device for beam training of the radio transceiver device, the radio transceiver device comprising at least two antenna arrays and configured to:
   receive, during the beam training, a first set of occurrences of a reference signal using all the antenna arrays and such that one respective occurrence of the reference signal is received in one single wide beam at each of all the antenna arrays; and
   receive, during the beam training, a second set of occurrences of the reference signal using less than all antenna arrays and such that one respective occurrence of the reference signal is received in each respective narrow beam at each of the less than all antenna arrays, wherein which of the less than all antenna arrays to receive the second set of occurrences of the reference signal is determined based on evaluation of reception of the first set of occurrences of the reference signal at each of all the antenna arrays, wherein only a single one of the antenna arrays is used when receiving the second set of occurrences of the reference signal.

19. A computer program product for beam training of a radio transceiver device comprising at least two antenna arrays, the computer program product comprising a non-transitory computer readable medium storing computer code which, when run on processing circuitry of the radio transceiver device, causes the radio transceiver device to:

receive, during the beam training, a first set of occurrences of a reference signal using all the antenna arrays and such that one respective occurrence of the reference signal is received in one single wide beam at each of all the antenna arrays; and receive, during the beam training, a second set of occurrences of the reference signal using less than all antenna arrays and such that one respective occurrence of the reference signal is received in each respective narrow beam at each of the less than all antenna arrays, wherein which of the less than all antenna arrays to receive the second set of occurrences of the reference signal is determined based on evaluation of reception of the first set of occurrences of the reference signal at each of all the antenna arrays, wherein only a single one of the antenna arrays is used when receiving the second set of occurrences of the reference signal.

* * * * *